US012709659B2

(12) United States Patent
Zhou et al.

(10) Patent No.: US 12,709,659 B2
(45) Date of Patent: Aug. 18, 2026

(54) AROMATIC THERMOSET RESINS

(71) Applicant: ExxonMobil Technology and Engineering Company, Annandale, NJ (US)

(72) Inventors: Huaxing Zhou, Warwick, PA (US); Victor Deflorio, Newtown, NJ (US); Mikel A. Nittoli, Hillsborough, NJ (US); Abhimanyu O. Patil, Annandale, NJ (US); Peter A. Gordon, Yardley, PA (US); Robert M. Shirley, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 568 days.

(21) Appl. No.: 18/249,555

(22) PCT Filed: Oct. 29, 2021

(86) PCT No.: PCT/US2021/072122

§ 371 (c)(1),
(2) Date: Apr. 19, 2023

(87) PCT Pub. No.: WO2022/099248

PCT Pub. Date: May 12, 2022

(65) Prior Publication Data

US 2023/0391946 A1 Dec. 7, 2023

Related U.S. Application Data

(60) Provisional application No. 63/109,424, filed on Nov. 4, 2020.

(51) Int. Cl.
*C08G 61/10* (2006.01)
*C09K 8/80* (2006.01)

(52) U.S. Cl.
CPC ................ *C08G 61/10* (2013.01); *C09K 8/80* (2013.01); *C08G 2261/124* (2013.01); *C08G 2261/312* (2013.01); *C08G 2261/42* (2013.01)

(58) Field of Classification Search
CPC .............. C08G 61/10; C08G 2261/124; C08G 2261/312; C08G 2261/42; C08G 18/3876;
(Continued)

(56) References Cited

U.S. PATENT DOCUMENTS

| | | | |
|---|---|---|---|
| 2,914,579 | A | 11/1959 | Erich et al. |
| 3,407,178 | A | 10/1968 | Heinrich et al. |

(Continued)

FOREIGN PATENT DOCUMENTS

| | | |
|---|---|---|
| EP | 3012275 | 4/2016 |
| JP | S6351424 | 3/1988 |
| WO | 2007058994 | 5/2007 |

OTHER PUBLICATIONS

International Search Report and Written Opinion for PCT/US2021/072122 dated Feb. 22, 2022.

*Primary Examiner* — Shane Fang
(74) *Attorney, Agent, or Firm* — C. Tumey Law Group PLLC

(57) ABSTRACT

Processes for chemically treating mixed aromatic feedstock to form thermoset aromatic resins are provided. The thermoset materials possess high compressive strength and find particular use in load-bearing applications, for example, infrastructure applications, as proppants, and as components in composite materials.

13 Claims, 9 Drawing Sheets

(58) Field of Classification Search

CPC .... C08G 77/26; C09K 8/80; C09J 5/02; C09J 5/04; C09J 175/04; C09J 183/08; C09J 2301/50; C09J 2203/00; C09J 2400/146; C09J 2400/20; C09J 2483/003; B32B 17/06; B32B 7/12; B32B 37/1284; B32B 2315/08; B32B 2605/00; C03C 17/30; C03C 27/048; C03C 27/10

See application file for complete search history.

(56) References Cited

U.S. PATENT DOCUMENTS

| | | | | |
|---|---|---|---|---|
| 4,082,728 | A | 4/1978 | Aziz et al. | |
| 4,176,095 | A | 11/1979 | Aziz et al. | |
| 5,017,683 | A | 5/1991 | Otani et al. | |
| 8,344,070 | B2 | 1/2013 | Squire et al. | |
| 11,059,941 | B2 | 7/2021 | Zhou et al. | |
| 2012/0123028 | A1 | 5/2012 | Dreesen et al. | |
| 2012/0270731 | A1* | 10/2012 | Gaab | B01D 53/02 502/402 |
| 2019/0315912 | A1 | 10/2019 | Zhou et al. | |
| 2020/0208047 | A1 | 7/2020 | Gordon et al. | |

* cited by examiner

AROMATIC THERMOSET RESINS

FIELD

This disclosure relates to aromatic thermoset resins formed by linking aromatic hydrocarbon molecules and/or aromatic heterocyclic molecules present in mixed aromatic feedstocks with suitable linking agents so as to effect polymerization of the molecules. The thermoset resins have very high compressive strength and find use in load bearing applications, such as infrastructure applications, as proppants and as components in composite materials.

BACKGROUND

In the oil and gas industry, crude oil is separated or converted via various chemical processes into useful petroleum products. Currently the desired products are various types of fuels, lubes and other basic petroleum chemicals, for example, ethylene, propylene, benzene, toluene, xylenes, etc. However, the heavier molecules in the crude oil (usually C10+) or the complex molecules generated during petrochemical processes are generally of low value and tend to have a higher carbon to hydrogen ratio and aromatic structures. Such complex residues may also contain a high heteroatom content. Over the past several decades, various chemical processes have been developed to further process such complex feedstocks. The most common ones include different coking processes, in which the complex feedstocks under high temperature dealkylate and cleave to form lighter molecules. In other processes, these complex feedstocks are hydrotreated and then cracked with catalysts or with steam into smaller molecules that can have intrinsic fuel value, depending upon the degree of hydrogenation and cracking. For all these processes, a part of the feedstock will polymerize and dehydrogenate into polyaromatic hydrocarbons and in some cases, extremely heavy carbon soot. In addition, such processes are usually energy-intensive, and value creation becomes increasingly marginal, while still leaving the issue of identifying possible value from the residual coke or related product(s).

Therefore, processes have been developed to further modify these aromatic and heavy feedstocks for various applications. For example, some feedstocks with certain viscosity and composition are used as carbon fiber precursors to produce pitch-based carbon fibers. There have also been studies in the bitumen industry on the various ways to modify bitumen types of materials as binders for road paving materials to improve the deformation resistance and cracking resistance. These methods include blending polymers (e.g. SBS, EPDM, PE, PVC, etc.), adding acids (e.g. polyphosphoric acid), grafting alkyl chains, sulphonation, oxidation (e.g. blowing air) and combinations of several methods. There are reports of using crosslinking reactions for bitumen modification. However, these reactions normally require additions of one or more polymer or block copolymer (see, e.g., US20120123028A1; WO2007/058994) into the bitumen, and do not lead to a product that can be used to replace commonly used thermoset material.

Thermoset materials are used in many industries, such as automotive/aircraft, wood processing, building construction, mechanical engineering, equipment manufacturing, abrasives, foundry components, steel, paint, adhesives, as well as the electrical industry. The commonly used thermoset materials include phenolics, epoxies, urea resins, melamine, furan, and unsaturated polyester resins, as well as thermosetting polyurethane, acrylate, and silicone resins. However, current thermoset materials are relatively expensive compared to thermoplastic commodity materials and construction materials such as cement and wood.

U.S. Patent Application Publication No. 20190315912 discloses a method of crosslinking aromatic hydrocarbon feedstocks to produce thermoset materials by addition of crosslinkers and initiating crosslinking reactions with catalysts.

However, the crosslinking process generates low molecular weight by-products for some crosslinkers, for example, water or HX (X is chlorine, bromine or iodine atoms). Although thermoset materials can be made as described in the patent application, such low molecular weight coproducts lead to foaming of the products and yield foam-like materials. These foam-like materials may be desirable in some applications, for example, insulation, sound-proofing, and fire-resistant materials, however their mechanical properties are generally inferior for load-bearing applications.

In view of the foregoing, there remains a need to provide aromatic thermoset materials with mechanical properties suitable for load-bearing applications and methods for their manufacture.

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

SUMMARY

The present disclosure is directed to new methods for preparing thermoset materials from mixed aromatic feedstocks. The materials exhibit high mechanical strength, especially compressive strength.

In one aspect the present disclosure provides a method of making a thermoset material from a mixed aromatic feedstock comprising:

- contacting a linker agent and a catalyst with a mixed aromatic feedstock at a temperature effective to react the linker agent with molecules in the mixed aromatic feedstock, wherein the contacting is conducted at a first pressure for a first time; and
- curing reaction products formed during the first time at a second pressure for a second time, wherein the second pressure is higher than the first pressure;

wherein the linker agent contains at least two functional groups that can react with the molecules in the mixed aromatic feedstock.

In embodiments, the linker agent and catalyst are contacted with the mixed aromatic feedstock initially at relatively low pressure to react the linker agent with molecules in the mixed aromatic feedstock and the resulting reaction products subsequently cured at a relatively higher pressure.

In some embodiments, the mixed aromatic feedstock and linker agent are reacted at the first pressure until before the gel point is reached, at which time the pressure is raised to the second pressure.

In some embodiments, the first pressure is about 2.0 bar (200 kPa) or less, or about 1.5 bar (150 kPa) or less, or substantially atmospheric pressure.

In some embodiments, the second pressure is greater than about 2 bar (200 kPa), or greater than about 3 bar (300 kPa), or greater than about 4 bar (400 kPa), or greater than about 5 bar (500 kPa), or greater than about 10 bar (1 MPa).

In some embodiments, the first time may be between about 1 hour and about 10 hours, or between 2 hours and about 8 hours, or between 3 hours and about 6 hours.

In some embodiments, the second time may be between about 1 hour and about 48 hours, or between 2 hours and about 36 hours, or between 3 hours and about 24 hours.

In some embodiments, the linker agent and molecules in the mixed aromatic feedstock are reacted for the first time at a temperature between about 20° C. and about 400° C., or between about 80° C. and about 200° C.

In some embodiments, the reaction products are cured for the second time at a temperature between about 100° C. and about 400° C. or between about 100° C. and about 200° C.

In embodiments, the linker agent has the structure of Formula 1:

(Formula 1)

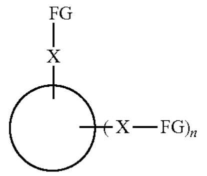

wherein the circle represent an aromatic hydrocarbon or aromatic heterocyclic moiety; FG (functional group) is, independently, aldehyde, vinyl, halogen, hydroxyl, acyl halide, tosylate, mesylate, carboxylic acid; each X, when present, is, independently, alkylene, cycloalkylene, or arylene bonded to a ring carbon atom of the aromatic hydrocarbon or aromatic heterocyclic moiety; n is an integer in the range of 1 to 5.

In some embodiments the —X-FG moieties are bonded to the same ring of the aromatic hydrocarbon or aromatic heterocyclic moiety.

Additionally or alternatively, the —X-FG moieties are bonded to different rings of the aromatic hydrocarbon or aromatic heterocyclic moiety.

In embodiments, FG is aldehyde, halogen, hydroxyl, acyl halide, tosylate, mesylate, or carboxylic acid.

In embodiments, FG is hydroxyl or halogen.

In embodiments, X is methylene.

In embodiments, n is 1.

In embodiments, the linker agent has the structure of Formula 2:

(Formula 2)

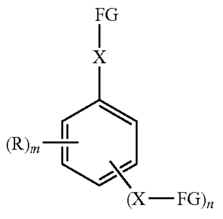

wherein FG (functional group) is, independently, aldehyde, vinyl, halogen, hydroxyl, acyl halide, tosylate, mesylate, carboxylic acid; each X, when present, is, independently, alkylene, cycloalkylene, or arylene; each R is, independently, H or alkyl, n is an integer in the range of 1 to 5 and m is 5−n.

In embodiments, FG is aldehyde, halogen, hydroxyl, acyl halide, tosylate, mesylate, or carboxylic acid.

In embodiments, FG is hydroxyl or halogen.

In embodiments, X is methylene.

In embodiments, n is 1.

In other embodiments, the linker agent has the structure of Formula 3.

(Formula 3)

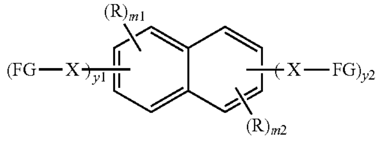

wherein FG (functional group) is, independently, aldehyde, vinyl, halogen, hydroxyl, acyl halide, tosylate, mesylate, carboxylic acid; each X, when present, is, independently, alkylene, cycloalkylene, or arylene; each R is, independently, H or alkyl; $y1+y2$ is an integer between 2 and 8; and $m1+m2=8-(y1+y2)$.

In embodiments, FG is aldehyde, halogen, hydroxyl, acyl halide, tosylate, mesylate, or carboxylic acid.

In embodiments, FG is hydroxyl or halogen.

In embodiments, X is methylene.

In embodiments, $y1+y2$ is 2.

In embodiments, R is hydrogen.

In some embodiments the —X-FG moieties are bonded to the same ring of the naphthalene moiety. In other embodiments the —X-FG moieties are bonded to different rings of the naphthalene moiety.

In other embodiments, the linker agent has the structure of Formula 4.

(Formula 4)

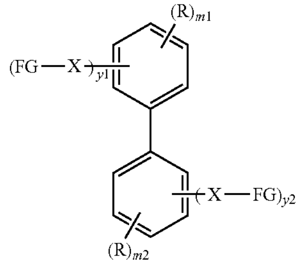

wherein FG (functional group) is, independently, aldehyde, vinyl, halogen, hydroxyl, acyl halide, tosylate, mesylate, carboxylic acid; each X, when present, is, independently, alkylene, cycloalkylene, or arylene; each R is, independently, H or alkyl; $y1+y2$ is an integer between 2 and 10; and $m1+m2=10-(y1+y2)$.

In embodiments, FG is aldehyde, halogen, hydroxyl, acyl halide, tosylate, mesylate, or carboxylic acid.

In embodiments, FG is hydroxyl or halogen.

In embodiments, X is methylene.

In embodiments, $y1+y2$ is 2.

In embodiments, R is hydrogen.

In some embodiments the —X-FG moieties are bonded to the same ring of the biphenyl moiety. In other embodiments the —X-FG moieties are bonded to different rings of the biphenyl moiety.

In some embodiments the catalyst is selected from a group consisting of inorganic acids, organic acids, and Lewis acids.

In some embodiments, the catalyst is selected from a group consisting of aluminium chloride, trifluoromethanesulfonic acid, p-toluenesulfonic acid, sulfuric acid, phosphoric acid, polyphosphoric acid, solid acids such as tungstic acid, and polyoxometalate.

In embodiments, the linker agent is present in the amount of 0.1% to 200% by weight, or 50% to 200% by weight, based on the weight of the mixed aromatic feedstock.

In embodiments, the catalyst is present in the amount of 0.1% to 10% by weight, based on the total weight of the mixed aromatic feedstock and linker agent.

In some embodiments, the presently disclosed methods are performed in the absence of additional solvent.

In embodiments, the mixed aromatic feedstock comprises a light aromatic stream, including aromatics from steam cracking (e.g., BT(E)X and pyrolysis gasoline), reformate from catalytic reformers, and mixed alkylated naphthalenes.

In embodiments, the mixed aromatic feedstock comprises one or more of residues of petrochemical refining or extraction, such as vacuum residue, fluidic catalytic cracking ('FCC') bottoms (slurry oil, main column bottoms (MCB)), steam cracker tar, asphaltenes, C3-C7 rock, bitumen, K-pot bottoms, lube extracts, various streams from refinery processes and other synthetic aromatic hydrocarbons.

In embodiments, the mixed aromatic feedstock has a H/C ratio less than 1.2.

In embodiments, the mixed aromatic feedstock has an aromatic content of greater than 50% by weight, or greater than 60% by weight, or greater than 70% by weight, or greater than 80% by weight.

In embodiments, the average molecular weight of molecules in the mixed aromatic feedstock is between about 50 and about 1200 Daltons, or between about 150 and about 1200 Daltons, or between about 300 and about 1200 Daltons, or between about 400 and about 1200 Daltons, or between about 600 and about 900 Daltons, or between about 650 and about 850 Daltons.

In embodiments, the mixed aromatic feedstock comprises one or more transition metals.

In embodiments, at least some of the molecules in the mixed aromatic feedstock comprise one or more atoms selected from the group consisting of nitrogen, sulfur and oxygen.

In embodiments, at least some of the molecules in the mixed aromatic feedstock comprise one or more functional groups comprising one or more of oxygen, nitrogen or sulfur atoms, wherein said functional groups are present as a substituent or within a substituent on an aromatic or aliphatic carbon atom.

In preferred embodiments the mixed aromatic feedstock contains a plurality of different aromatic hydrocarbon molecules and/or different aromatic heterocyclic molecules.

In some embodiments, the mixed aromatic feedstock comprises 2 or more, or 5 or more, or 10 or more, or 20 or more, or 50 or more, or 100 or more, or 1,000 or more, or 5,000 or more, or 10,000 or more, or 100,000 or more, different molecules. In particularly preferred embodiments the plurality of different aromatic hydrocarbon molecules and/or different aromatic heterocyclic molecules comprises 100 or more, or 1,000 or more different molecules.

In some embodiments the full width half maximum molecular weight of the plurality of different aromatic hydrocarbon molecules and/or different aromatic heterocyclic molecules in the mixed aromatic feedstock is between about 500 and about 1000 Daltons.

In another aspect the present disclosure provides a thermoset material obtained by any one of the herein disclosed methods.

In embodiments, the thermoset material has a compressive strength greater than about 100 MPa, when measured according to ASTM D695.

In some embodiments, the thermoset material has a compressive strength greater than about 110 MPa, or greater than about 120 MPa, or greater than about 130 MPa, or greater than about 140 MPa, or greater than about 150 MPa, or greater than about 160 MPa, when measured according to ASTM D695.

In some embodiments the thermoset material comprises linear chains comprising aromatic hydrocarbon moieties and/or aromatic heterocyclic moieties.

In other embodiments the thermoset material comprises crosslinked chains comprising aromatic hydrocarbon moieties and/or aromatic heterocyclic moieties.

In another aspect the present disclosure provides a thermoset material comprising a plurality of aromatic hydrocarbon moieties and/or aromatic heterocyclic moieties linked by linking groups, wherein the thermoset material has a compressive strength greater than 100 MPa, when measured according to ASTM D695.

The linking groups may be derived from any one or more of the herein disclosed linking agents.

In some embodiments, the thermoset material has a compressive strength greater than about 110 MPa, or greater than about 120 MPa, or greater than about 130 MPa, or greater than about 140 MPa, or greater than about 150 MPa, or greater than about 160 MPa, when measured according to ASTM D695.

In embodiments, the weight average molecular weight of the herein disclosed thermoset material is greater than about 100,000 Daltons, or greater than about 200,000 Daltons, or greater than about 300,000 Daltons, or greater than about 500,000 Daltons, or greater than about 700,000 Daltons, or greater than about 1,000,000 Daltons.

In another aspect the present disclosure provides an article of manufacture comprising one or more thermoset materials according to any one of the herein disclosed embodiments.

In another aspect the present disclosure provides proppant particulates comprising one or more thermoset materials according to any one of the herein disclosed embodiments.

In embodiments, the proppant particulates possess high fracture conductivity at high pressure. In some embodiments, the proppant particulates possess high fracture conductivity above 6000 psi (41.4 MPa), or above 7000 psi (48.3 MPa), or above 8000 psi (55.2 MPa). Fracture conductivities may exceed 100 mD·ft (30 mD·m) at these pressures.

In another aspect the present disclosure provides a method, said method comprising:

- providing a plurality of proppant particulates comprising one or more thermoset materials according to any one of the herein disclosed embodiments;
- introducing a fracturing fluid comprising the plurality of proppant particulates into a subterranean formation; and
- depositing at least a portion of the plurality of proppant particulates within one or more fractures in the subterranean formation.

In another aspect, the present disclosure provides a composite comprising one or more thermoset materials according to any one of the herein disclosed embodiments and at least one other material, for example, a filler and/or another polymer.

Further features and advantages of the present disclosure will be understood by reference to the following drawings and detailed description.

DETAILED DESCRIPTION OF THE EMBODIMENTS

Figure 1:
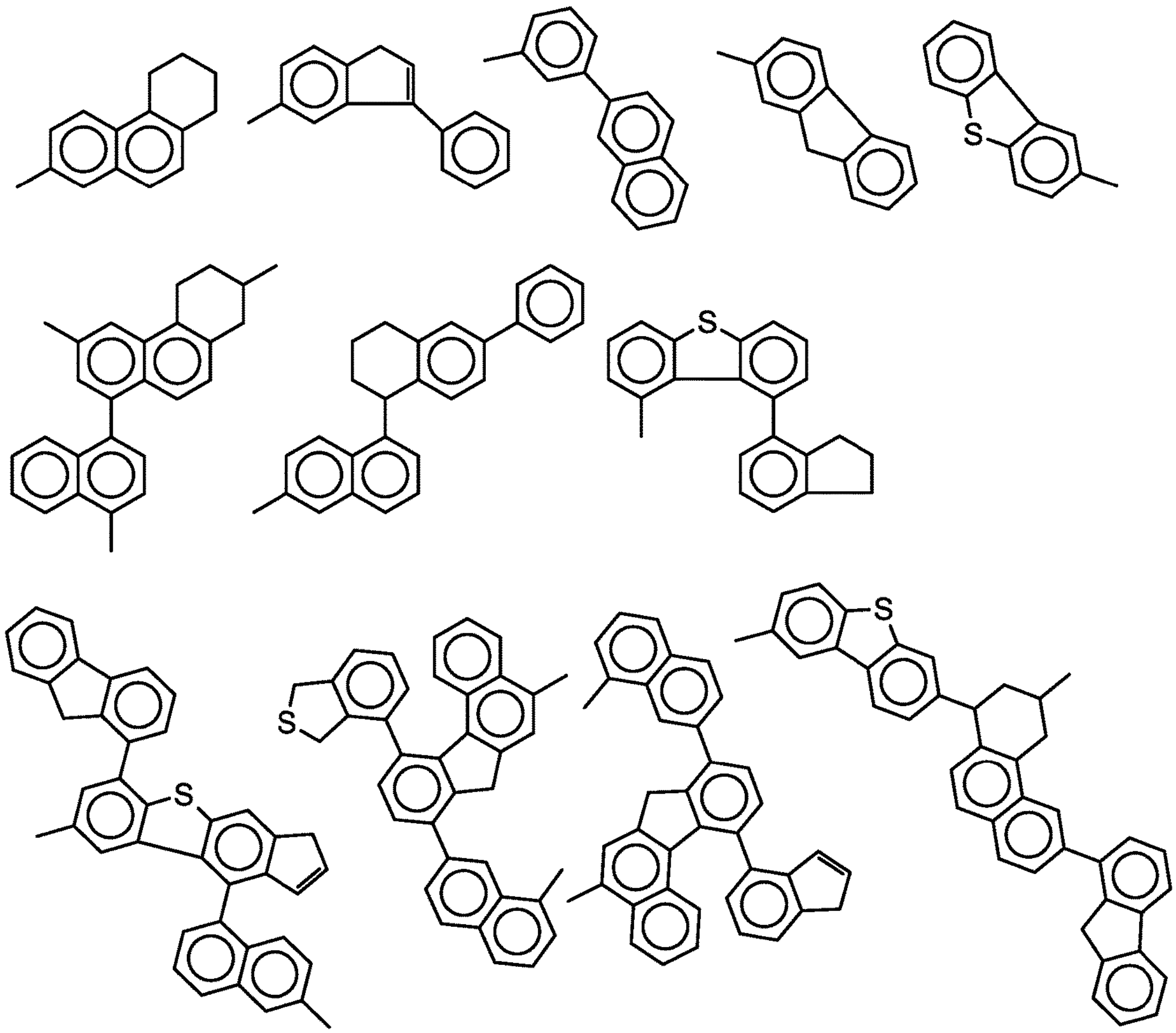
FIG. 1 illustrates the structures of various aromatic hydrocarbon molecules and aromatic heterocyclic molecules present in mixed aromatic feedstock.

The following is a detailed description of the disclosure provided to aid those skilled in the art in practicing the present disclosure. Those of ordinary skill in the art may make modifications and variations in the embodiments described herein without departing from the spirit or scope of the present disclosure.

Although any compositions, processes and materials similar or equivalent to those described herein can also be used in the practice or testing of the present disclosure, the preferred compositions, processes and materials are now described.

It must also be noted that, as used in the specification and the appended claims, the singular forms 'a', 'an' and 'the' include plural referents unless otherwise specified. Thus, for example, reference to 'aromatic hydrocarbon' may include more than one aromatic hydrocarbon, and the like.

Throughout this specification, use of the terms 'comprises' or 'comprising' or grammatical variations thereon shall be taken to specify the presence of stated features, integers, steps or components but does not preclude the presence or addition of one or more other features, integers, steps, components or groups thereof not specifically mentioned.

Unless specifically stated or obvious from context, as used herein, the term 'about' is understood as within a range of normal tolerance in the art, for example within two standard deviations of the mean. 'About' can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term 'about'.

Any processes provided herein can be combined with one or more of any of the other processes provided herein.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as Hawley's Condensed Chemical Dictionary 14th Edition, by R. J. Lewis, John Wiley & Sons, New York, N.Y., 2001.

As used herein, the term 'mixed aromatic feedstock' means a feedstock that comprises mixtures of different aromatic hydrocarbon molecules and/or mixtures of different aromatic heterocyclic molecules. Aromatic hydrocarbon molecules and/or aromatic heterocyclic molecules are constituents of one or more of residues of petrochemical refining or extraction, such as vacuum residue, fluidic catalytic cracking ('FCC') bottoms (slurry oil, main column bottoms (MCB)), steam cracker tar, asphaltenes, C3-C7 rock, bitumen, K-pot bottoms, lube extracts, various streams from refinery processes (e.g. Aromatic 200, Aromatic 150, and other aromatic-rich streams that have a high proportion of aromatics, for example >80% aromatics) and other synthetic aromatic hydrocarbons.

As used herein, the term 'aromatic hydrocarbon' refers to a hydrocarbon having at least one ring which is aromatic. Aromatic hydrocarbons fall within the class of arene molecules, and may comprise one or more aromatic rings with 4- or 5- or 6- or 7-, or 8 or more-membered carbon rings. They may be either alternant aromatic hydrocarbons (benzenoids), or non-alternant hydrocarbons, which may be either non-alternant conjugated or non-alternant non-conjugated hydrocarbons. Examples of aromatic hydrocarbon molecules include, but are not limited to, benzene, toluene, xylene, acenaphthene, acenaphthylene, anthanthrene, anthracene, azulene, benzo[a]anthracene, benzo[a]fluorine, benzo[c]phenanthrene, benzopyrene, benzo[a]pyrene, benzo[e]pyrene, benzo[b]fluoranthene, benzo[j]fluoranthene, benzo[k]fluoranthene, benzo[ghi]perylene, chrysene, corannulene, coronene, dicoronylene, diindenoperylene, fluorene, fluoranthene, fullerene, helicene, heptacene, hexacene, indene, kekulene, naphthalene, ovalene, pentacene, perylene, phenalene, phenanthrene, dihydrophenanthrene, picene, pyrene, tetracene, triphenylene, and their isomers or derivatives or combinations or condensed forms.

The aromatic hydrocarbons may also comprise molecules which contain the above disclosed aromatic hydrocarbons as fragments within larger molecules.

As used herein, the term 'aromatic heterocyclic' refers to a cyclic aromatic molecule that includes at least one heteroatom in an aromatic ring. Aromatic heterocyclic molecules can also be referred to as heteroaromatic molecules. Typical heteroatoms include oxygen, nitrogen, and sulfur. Examples of aromatic heterocyclic molecules include, but are not limited to, pyridine, furan, acridine, benzimidazole, 2H-1-benzothine, benzthiazole, benzo[b]furan, benzo[b]

thiophene, benzo[c]thiophene, carbazole, cinnoline, dibenzothiophene, iminodibenzyl, 1H-indazole, indole, indolizine, isoindole, isoquinoline, 1,5-naphthyridine, 1,8-naphthyridine, phenanthridine phenanthroline, phenazine, phenoxazine, phenothiazine, phthalazine, quinazoline, quinoline, 4H-quinolizine, thianthrene, and xanthene and their isomers, derivatives or combinations.

The aromatic heterocyclic molecules may also comprise molecules which contain the above disclosed aromatic heterocyclic molecules as fragments within larger molecules.

The aromatic hydrocarbon molecules and aromatic heterocyclic molecules may additionally comprise one or more functional groups comprising one or more of oxygen, nitrogen or sulfur atoms, wherein said functional group is present as a substituent or within a substituent on an aromatic or aliphatic carbon atom.

In one embodiment the present disclosure provides a method of making a thermoset material from a mixed aromatic feedstock comprising:

- contacting a linker agent and a catalyst with a mixed aromatic feedstock at a temperature effective to react the linker agent with molecules in the mixed aromatic feedstock, wherein the contacting is conducted at a first pressure for a first time; and
- curing reaction products formed during the first time at a second pressure for a second time, wherein the second pressure is higher than the first pressure;
- wherein the linker agent contains at least two functional groups that can react with the molecules in the mixed aromatic feedstock.

An advantage of the presently disclosed method is that volatile components, such as by-products, may be removed from the reaction product prior to curing. This minimizes the possibility of preparing foam like materials. This may result in thermoset resins having improved properties, for example improved compressive strength.

Mixed Aromatic Feedstock

Particularly suitable aromatic hydrocarbons and aromatic heterocyclics for forming the thermoset resins of the present disclosure may be obtained from various refinery process streams that otherwise have low intrinsic value, oftentimes a waste stream. By forming a crosslinked reaction product according to the disclosure herein, a considerably more valuable and useful material may be obtained. In illustrative embodiments, refinery process streams containing aromatic hydrocarbons and aromatic heterocyclics suitable for use in the disclosure herein may include, for example, steam cracker tar, main column bottoms, vacuum residue, C5 rock, C3-C5 rock, slurry oil, asphaltenes, bitumen, K-pot bottoms, lube extracts, and any combination thereof. These terms will be familiar to one having ordinary skill in the art. Particular discussion regarding these refinery process streams is provided hereinafter.

Steam cracker tar (also referred to as steam cracked tar or pyrolysis fuel oil) may comprise a suitable source of aromatic hydrocarbons and aromatic heterocyclics in some embodiments of the present disclosure. "Steam cracker tar" is the high molecular weight material obtained following pyrolysis of a hydrocarbon feedstock into olefins, as described, for example, in U.S. Pat. No. 8,709,233, which is incorporated herein by reference. Suitable steam cracker tar may or may not have had asphaltenes removed therefrom. Steam cracker tar may be obtained from the first fractionator downstream from a steam cracker (pyrolysis furnace) as the bottoms product of the fractionator, nominally having a boiling point of 288° C. and higher. In particular embodiments, steam cracker tar may be obtained from a pyrolysis furnace producing a vapor phase including ethylene, propylene, and butenes; a liquid phase separated as an overhead phase in a primary fractionation step comprising C5+ species including a naphtha fraction (e.g., C3-C10 species) and a steam cracked gas oil fraction (primarily C10-C15/C17 species having an initial boiling range of about 204° C. to 288° C.); and a bottoms fraction comprising steam cracker tar having a boiling point range above about 288° C. and comprising C15/C17+ species.

Main column bottoms (also referred to as FCC main column bottoms or slurry oil) may comprise a suitable source of polyaromatic hydrocarbons in some embodiments of the present disclosure. Typical aromatic hydrocarbons and aromatic heterocycles that may be present in main column bottoms include those having molecular weights ranging from about 250 to about 1000. Three to eight fused aromatic rings may be present in some instances. Aromatic hydrocarbons and aromatic heterocycles that may be present in main column bottoms include, but are not limited to, those shown in FIG. 1. Suitable main column bottoms may or may not have had asphaltenes removed therefrom. Residual cracking catalyst not removed cyclonically following cracking may or may not remain present in the main column bottoms. Both catalyst-containing and catalyst-free main column bottoms may be suitable for use in the present disclosure.

Vacuum residue may comprise a suitable source of aromatic hydrocarbons and aromatic heterocycles in some embodiments of the present disclosure. Like its name suggests, "vacuum residue" is the residual material obtained from a distillation tower following vacuum distillation. Vacuum residue may have a nominal boiling point range of about 600° C. or higher.

C3 rock or C3-C5 rock may comprise a suitable source of aromatic hydrocarbons and aromatic heterocycles in some embodiments of the present disclosure. C3-C5 rock refers to asphaltenes that have been further treated with propane, butanes and pentanes in a deasphalting unit. Likewise, C3 rock refers to asphaltenes that have been further treated with propane. C3 and C3-C5 rock may be high in metals like Ni and V and may contain high amounts of N and S heteroatoms in heteroaromatic rings.

Bitumen or asphaltenes may comprise a suitable source of polyaromatic hydrocarbons in some embodiments of the present disclosure. Some sources consider bitumen and asphaltenes to be synonymous with one another. In general, asphaltenes refer to a solubility class of materials that precipitate or separate from an oil when in contact with paraffins (e.g., propane, butane, pentane, hexane or heptane). Bitumen traditionally refers to a material obtained from oil sands and represents a full-range, higher-boiling material than raw petroleum.

Linker Agents

Examples of linker agents of Formula 2 include the following molecules wherein the —X-FG moieties are in para positions:

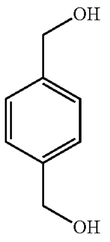 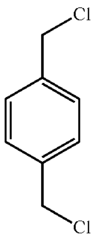 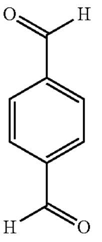 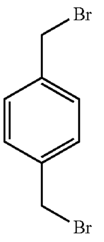 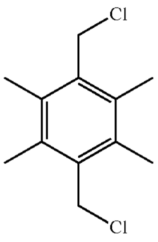

-continued

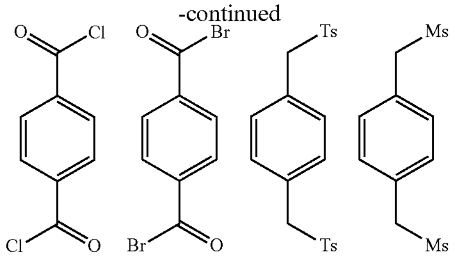

Alternatively, the —X-FG moieties are in ortho- or meta-positions.

Examples of linker agents of Formula 3 and Formula 4 include the following molecules:

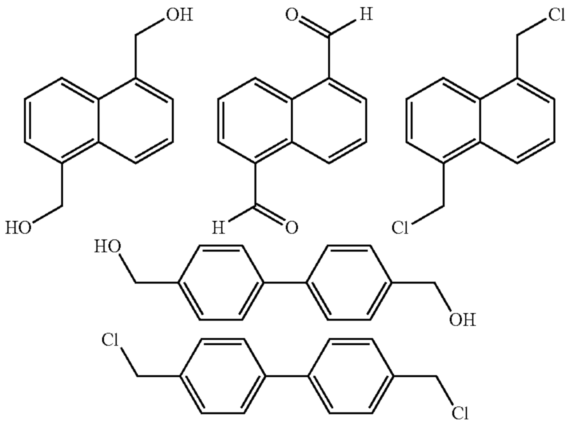

In some embodiments, the linker agent is in the amount of 1% to 200% by weight, based on the weight of the mixed aromatic feedstock. In some particular embodiments, the linker agent is in the amount of about 10% to about 200% by weight of the weight of the mixed aromatic feedstock. For example, the linker agent may be present in about 60% to about 180%, about 60% to about 160%, about 60% to about 140%, about 60% to about 120%, about 80% to about 180%, about 80% to about 160%, about 80% to about 140%, about 80% to about 120%, by weight, based on the weight of the mixed aromatic feedstock. In some embodiments the weight of linker agent relative to the weight of mixed aromatic feedstock is about 1 to 1.

Catalysts

In some embodiments, the catalyst is in the amount of 0.1% to 50% by weight of the total weight of the linker agent and the mixed aromatic feedstock. In some particular embodiments, the catalyst is in the amount of about 0.1% to about 40% w/w of the total weight of the linker agent and the mixed aromatic feedstock. For example, the catalyst may be present in about 0.1% to about 40%, about 0.1% to about 30%, about 0.1% to about 20%, about 0.1% to about 10%, about 0.5% to about 40%, about 0.5% to about 30%, about 0.5% to about 20%, about 0.5% to about 10%, about 1% to about 40%, about 1% to about 30%, about 1% to about 20%, about 1% to about 10% by weight of the total weight of the linker agent and the mixed aromatic feedstock.

Process

In embodiments, the linker agent and catalyst are contacted with the mixed aromatic feedstock initially at relatively low pressure to react the linker agent with molecules in the mixed aromatic feedstock and the resulting reaction products subsequently cured at a relatively higher pressure.

In some embodiments, the mixed aromatic feedstock and linker agent are reacted at the first pressure until before the gel point is reached, at which time the pressure is raised to the second pressure.

Advantageously, reacting the mixed aromatic feedstock and linker agent at a relatively low pressure prior to the gel point being reached allows low molecular weight components to be removed prior to curing the reaction products.

In some embodiments, the first pressure is about 2.0 bar (200 kPa) or less, or 1.5 bar (150 kPa) or less, or substantially atmospheric pressure.

In some embodiments, the second pressure is greater than 2 bar (200 kPa), or greater than 3 bar (300 kPa), or greater than 4 bar (400 kPa), or greater than 5 bar (500 kPa), or greater than 10 bar (1 MPa).

In some embodiments, the first time may be between about 1 hour and about 10 hours, or between 2 hours and about 8 hours, or between 3 hours and about 6 hours.

In some embodiments, the second time may be between about 1 hour and about 48 hours, or between 2 hours and about 36 hours, or between 3 hours and about 24 hours.

The method may be carried out over a wide range of temperatures and is carried out at a temperature sufficient to effect reaction. The temperature is preferably between about 20° C. to about 400° C., more preferably between about 40° C. to about 300° C., even more preferably between about 80° C. to about 200° C. Preferably the reaction temperature is above 20° C., or above 40° C., or above 60° C., or above 70° C., or above 80° C. The reaction can be carried out at a single temperature or, sequentially, at different temperatures.

In some embodiments, the linker agent and molecules in the mixed aromatic feedstock are reacted for the first time at a temperature between 20° C. and 400° C., or between 80° C. and 200° C.

In some embodiments, the reaction products are cured for the second time at a temperature between 100° C. and 400° C. or between 100° C. and 200° C.

If desired, the reaction may be carried out in a neutral solvent such as mineral oil, an inert hydrocarbon solvent, or a halogenated solvent such as carbon tetrachloride, but usually no solvent is necessary.

The extent of reaction may be monitored by measuring the amount of starting materials and/or products.

Proppants

The thermoset resins according to the present disclosure may be mechanically crushed to provide particulate materials. The particulate materials may be subsequently separated into fractions having particular particle size ranges. Such separation may be achieved through sieving or other methods well known in the art.

In some embodiments, the particulates formed from the thermoset resins of the present disclosure may have a density ranging from about 0.8 $g/cm^3$ to about 1.5 $g/cm^3$ or from about 1.0 $g/cm^3$ to about 1.5 $g/cm^3$.

Crush strength values for the particulates formed from the thermoset resins of the present disclosure may be determined using ISO 13503-2, which provides a weight percentage of fines formed at a given stress level. In particular embodiments, no fines may be formed from certain particulates disclosed herein at stress levels up to about 5000 psi.

The particulates disclosed herein may find use as proppants. Common proppant particulates can be used effectively during fracturing operations, but there may be issues associated with their use. First, the high densities of many common proppant particulates may hinder particulate transport, possibly leading to inadequate proppant disposition within a plurality of fractures. Second, some proppant particulates are prone to fines formation due to low crush strength values, which may lead to decreased fracture conductivity due to fines accumulation within a wellbore. Finally, polymeric gels used to promote transport of proppant particulates can themselves be problematic if they are not effectively removed from the fractures within a wellbore. Low-density proppant particulates may address the foregoing difficulties, at least in part, but they are oftentimes rather high in cost.

The present disclosure alleviates the foregoing difficulties and provides related advantages as well. In particular, the present disclosure provides proppant particulates that may exhibit low densities and high crush strengths, thereby addressing two significant shortcomings of traditional proppant particulates, such as sand and ceramics. The low density values may decrease or eliminate the need to utilize a gelled polymer to promote effective transport of the proppant particulates. Moreover, the proppant particulates disclosed herein may be formed readily from various low-cost polyaromatic hydrocarbon sources, such as those produced from various refinery process streams having high aromaticity that may otherwise have rather low intrinsic value.

EXAMPLES

Materials

Solvents and commercial reagents utilized in the experiments were used as received. ortho- and para-Xylene and 1,4-dimethanol benzene were obtained from TCI America. Aromatic 200 was obtained from ExxonMobil Baytown refinery, Main Column Bottom (MCB) was obtained from ExxonMobil Juliet Refinery, and steam cracker tar was obtained from ExxonMobil Singapore SOP2 refinery.

Analysis Methods

The tensile properties of the cured products were measured using an Instron 5565 tensile tester, in which a specimen of a standard shape and dimensions was prepared according to ASTM D 638: standard test method for tensile properties of plastics.

Fourier-transform ion cyclotron resonance mass spectrometry ("FTICR-MS") is used to determine the mass-to-charge ratio (m/z) of ions based on the cyclotron frequency of the ions in a fixed magnetic field. The FTICR-MS data obtained in the present disclosure was generated using the following method:

| | |
|---|---|
| Sample concentration: | 50 ppm in toluene |
| Syringe flow rate: | 120 uL/h |
| Ionization method: | APPI(+) (positive mode Atmospheric Pressure Photoionization) |
| Scans averaged: | 200 |
| Mass range: | 150-2000 m/z |
| Ion accumulation time: | 0.05 s |
| Calibration: | Internal, using a homologous series differing by CH2 units |

General Methods

In a typical method according to the present disclosure, mixed aromatic feedstock (e.g. aromatic 200) 5 g+1,4-dimethanol benzene 5 g (1:1 wt. ratio) and 1 wt. % catalyst were placed in a reactor and heated to 120° C. During the reaction the viscosity of the reaction mixture gradually increased. When the viscosity reached a honey-like viscosity, the reaction mixture was transferred into a mold and then placed in an autoclave and pressurized to 4 bar and slowly heated to 130° C. and held at that temperature for 10 hours. The pressure was then released and the mixture cooled to room temperature. The molded objects were then removed from the mold. The molded objects could be optionally further cured by placing in a 150° C. oven at atmospheric pressure.

Comparative Example

Aromatic 200 10 g, divinylbenzene linker 10 g (1:1 wt. ratio) and p-toluenesulfonic acid catalyst 60 mg were combined and the mixture heated to 60° C. The reaction mixture was heated to a temperature of 130° C. and transferred into a mold when the reaction mixture become viscous (typically around 5 hours) and the mixture cured overnight, then slowly cooled to room temperature.

In Examples 1 and 2, model reactions were performed using ortho- and para-xylene as model aromatic compounds and 1,4-dimethanol benzene as linker agent and curing of the materials was monitored using solid state NMR.

Figure 2:
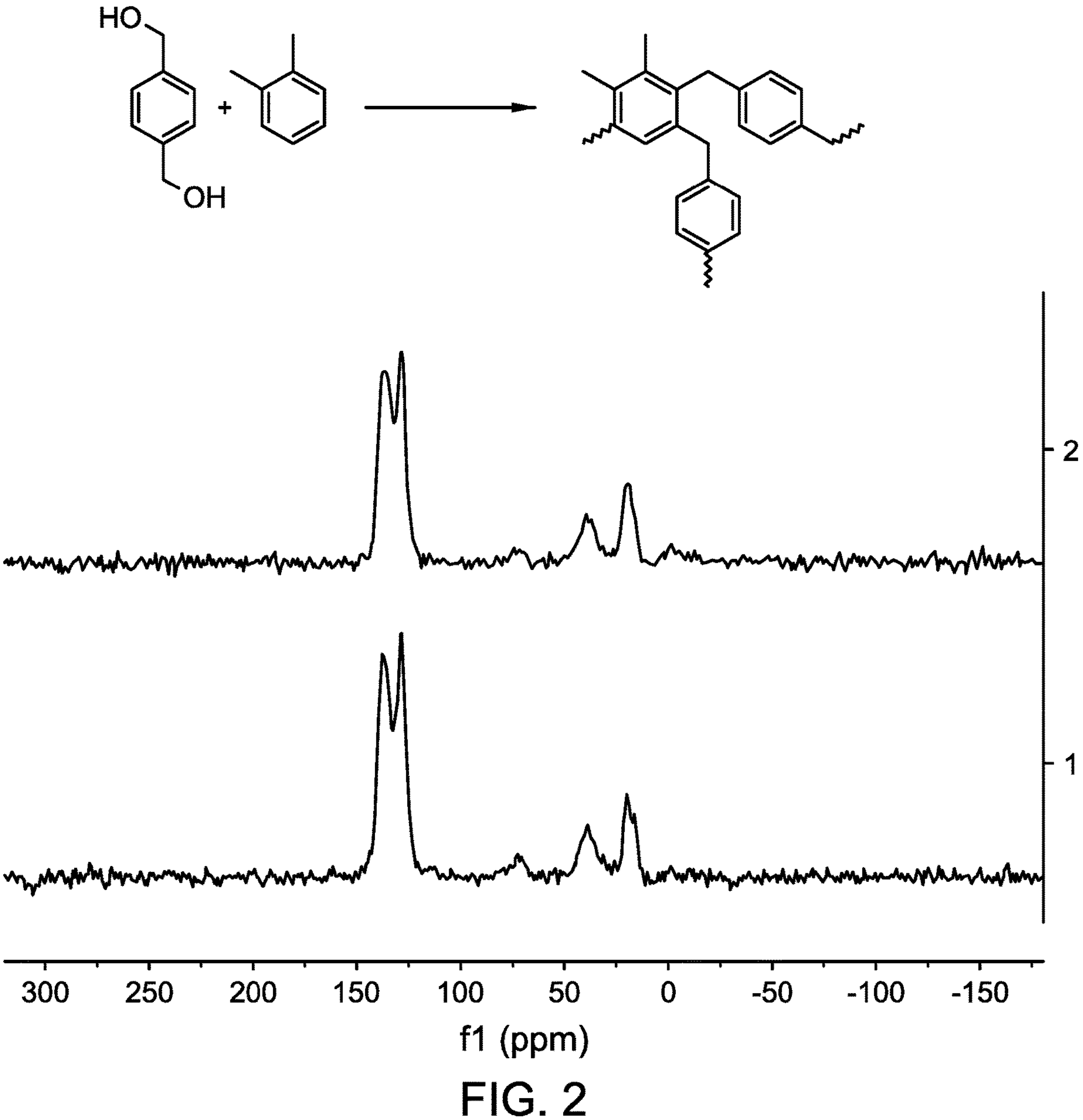
FIG. 2 illustrates 13C solid state NMR spectra of thermoset resins produced by reaction ortho-xylene with 1, 4-dimethanol benzene.

Example 1 ortho-Xylene 5 g and 1,4-dimethanol benzene 5 g (1:1 wt. ratio) and 100 mg (1 wt. %) 2-Naphthalenesulfonic acid catalyst were placed in a reactor and heated to 120° C. During the reaction the viscosity of the reaction mixture gradually increased. When the viscosity reached a honey-like viscosity the reaction mixture was transferred into a mold and placed in an autoclave and pressurized to 4 bar and slowly heated to 130° C. and held at that temperature for 10 hours. The pressure was then released and the mixture cooled to room temperature. The molded objects were then removed from the mold. The samples were cured further by placing in a 150° C. oven at atmospheric pressure. Sample 1 was cured at 150° C. for 5 hours and Sample 2 was cured at 150° C. for 10 hours. The solid state 13C NMR spectra of the cured products are shown in FIG. 2. The relative ratio of benzylic carbon peak (around 70 ppm) to the aromatic peak (around 130 ppm) afforded the approximate curing conversion. Sample 1 indicated 85% conversion and Sample 2 indicated 93% conversion.

Figure 3:
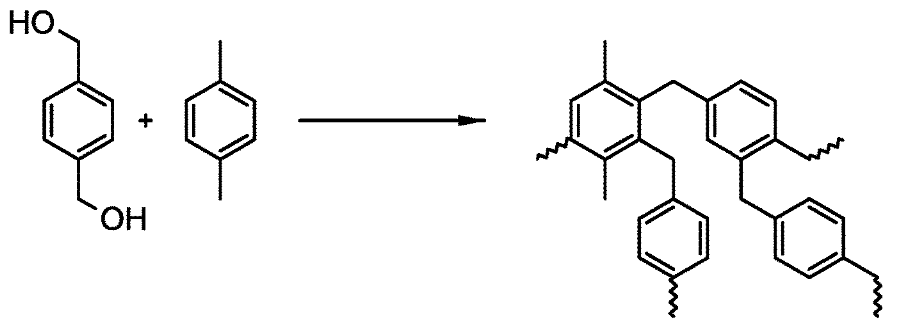
FIG. 3 illustrates 13C solid state NMR spectra of thermoset resins produced by reaction para-xylene with 1, 4-dimethanol benzene.
Figure 3:
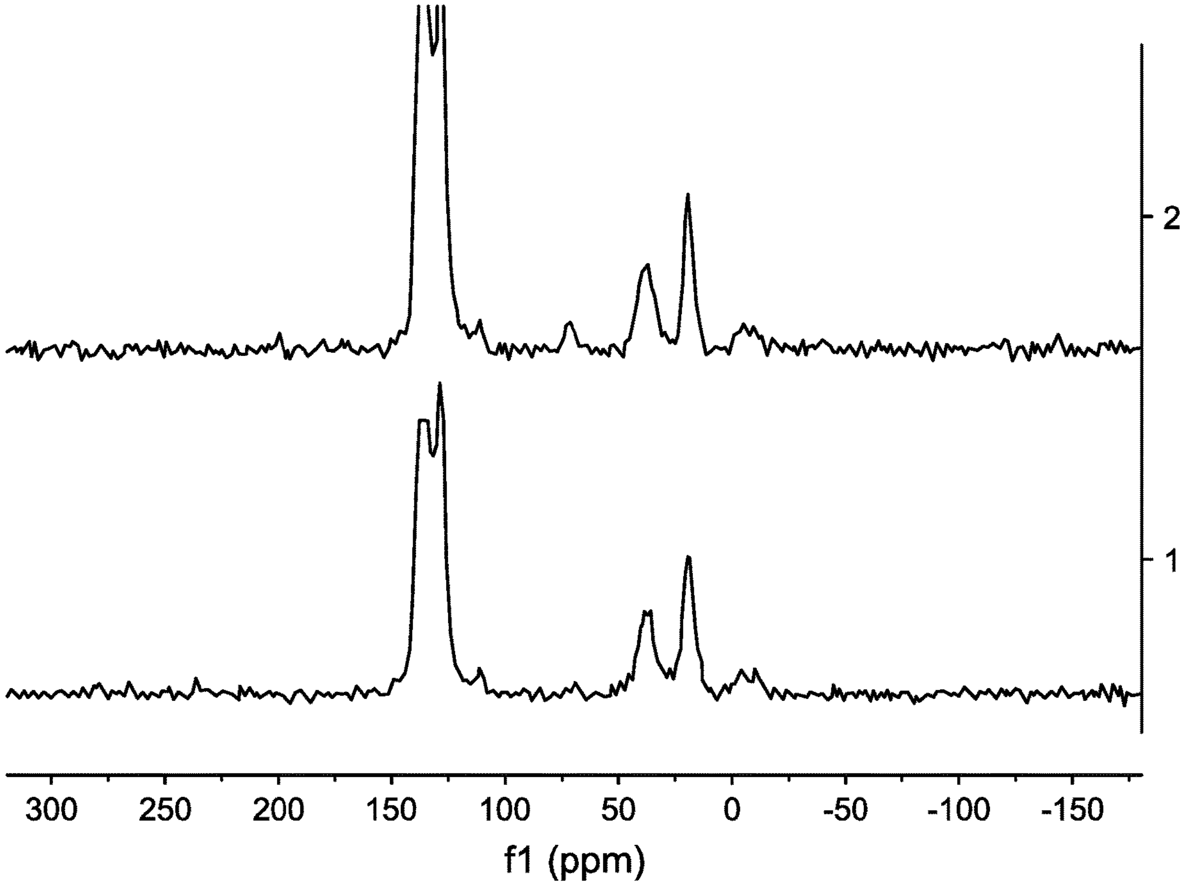

Example 2 para-Xylene 5 g and 1,4-dimethanol benzene 5 g (1:1 wt. ratio) and 100 mg (1 wt. %) 2-Naphthalenesulfonic acid catalyst were placed in a reactor and heated to 120° C. During the reaction the viscosity of the reaction mixture gradually increased. When the viscosity reached honey-like viscosity, the reaction mixture was transferred into a mold and placed in an autoclave and pressurized to 4 bar and slowly heated to 130° C. and held at that temperature for 10 hours. The pressure was then released and cooled to room temperature. The molded objects were then removed from the mold. These samples were cured further by placing in a 150° C. oven at atmospheric pressure. Sample 1 was cured at 150° C. for 5 hours and Sample 2 was cured at 150° C. for 10 hours. The solid state 13C NMR spectra of the cured products are shown in FIG. 3. The relative ratio of benzylic carbon peak (around 70 ppm) to the aromatic peak (around 130 ppm) afforded the approximate curing conversion. Sample 1 indicated 87% conversion and Sample 2 indicated 99% conversion.

Example 3

Aromatic 200 5 g and 1,4-dimethanol benzene 5 g (1:1 wt. ratio) and 100 mg (1 wt. %) 2-Naphthalenesulfonic acid catalyst were placed in a reactor and heated to 120° C. During the reaction the viscosity of the reaction mixture gradually increased. When the viscosity reached a honey-like viscosity the reaction mixture was transferred into a mold and then placed in an autoclave and pressurized to 4 bar and slowly heated to 130° C. and held at that temperature for 10 hours. The pressure was then released and the mixture cooled to room temperature. The molded objects were then removed from the mold. The samples were cured further by placing in a 150° C. oven at atmospheric pressure for 5 hours.

In Examples 4 and 5, more complex, mixed aromatic feedstocks were examined

Example 4

Main column bottom (MCB) 6 g and 1,4-dimethanol benzene 4 g (1.5:1 wt. ratio) and 100 mg (1 wt. %) 2-Naphthalenesulfonic acid catalyst were placed in a reactor and heated to 120° C. During the reaction the viscosity of the reaction mixture gradually increased. When the viscosity reached a honey-like viscosity the reaction mixture was transferred into a mold and then placed in an autoclave and pressurized to 4 bar and slowly heated to 130° C. and held at that temperature for hours. The pressure was then released and the mixture cooled to room temperature. The molded objects were then removed from the mold. The samples were cured further by placing in a 150° C. oven at atmospheric pressure for 5 hours.

Example 5

Steam cracker tar 6 g and 1,4-dimethanol benzene 4 g (1.5:1 wt. ratio) and 100 mg (1 wt. %) 2-Naphthalenesulfonic acid catalyst were placed in a reactor and heated to 120° C. During the reaction the viscosity of the reaction mixture gradually increased. When the viscosity reached a honey-like viscosity the reaction mixture was transferred into a mold and then placed in an autoclave and pressurized to 4 bar and slowly heated to 130° C. and held at that temperature for 10 hours. The pressure was then released and the mixture cooled to room temperature. The molded objects were then removed from the mold. The samples were cured further by placing in a 150° C. oven at atmospheric pressure for 5 hours.

Figure 4:
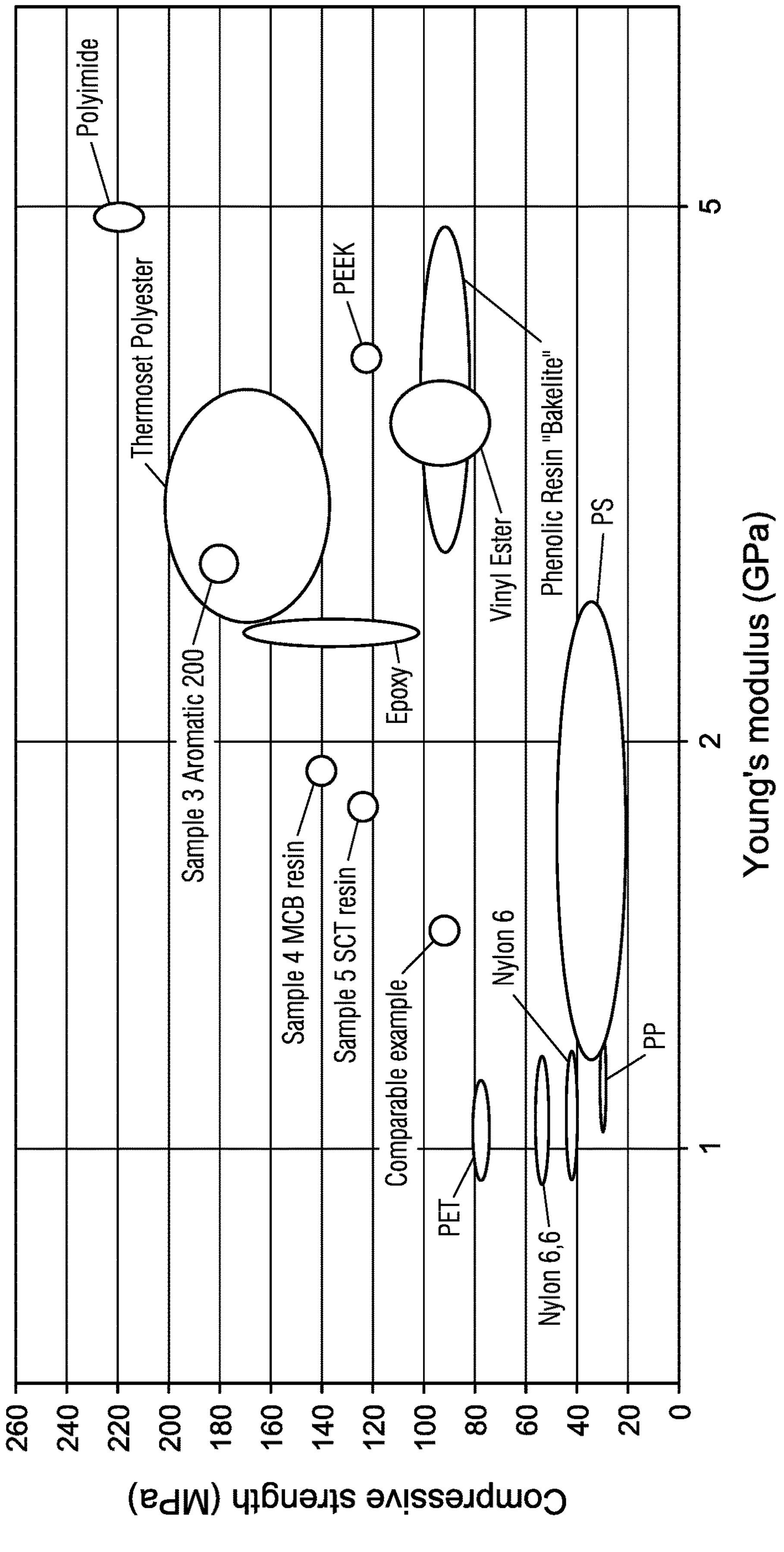
FIG. 4 is a plot of compressive strength vs Young's modulus for thermoset resins according to embodiments of the present disclosure and of comparative polymers.

Mechanical strengths were measured using compressive testing following ASTM D695, and the results are shown in FIG. 4 and benchmarked with other common polymers. The compressive strength of the aromatic resins prepared according to the present disclosure (Example 3 (Sample 3); Example 4 (Sample 4); and Example 5 (Sample 5) are comparable and even higher than some high performance engineering thermoplastics.

Further, Sample 3, prepared from Aromatic 200 and cured under pressure, had much higher compressive strength to the comparative example which was also prepared from Aromatic 200, but cured in the absence of applied pressure.

Additionally, when Example 3 was performed in the absence of pressure, a foam resulted which could be crushed by hand, indicative of its poor compressive strength.

Figure 5:
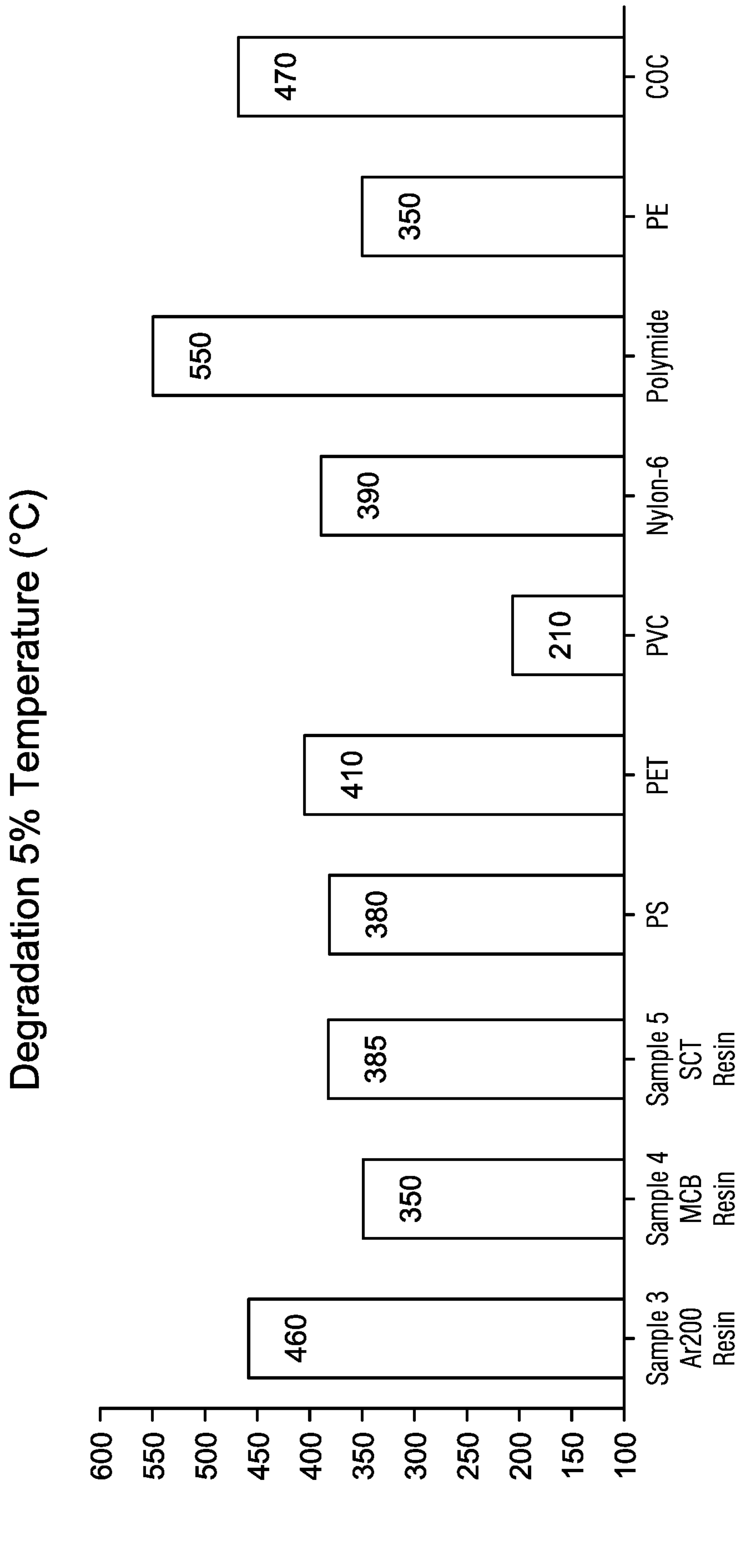
FIG. 5 is a bar chart of the 5% degradation temperatures of thermoset resins according to embodiments of the present disclosure and of comparative polymers.

The aromatic resins exhibited excellent high temperature and oxygen stability. Thermal Gravimetric Analysis (TGA) indicated less than 5% loss @460° C. for Example 3 (AR200 produced resin). The low volatiles also indicated high conversion and less residual VOC. FIG. 5 compares the temperatures at which 5% degradation occurred for examples 3-5 and various other polymers.

Example 6

Figure 6:
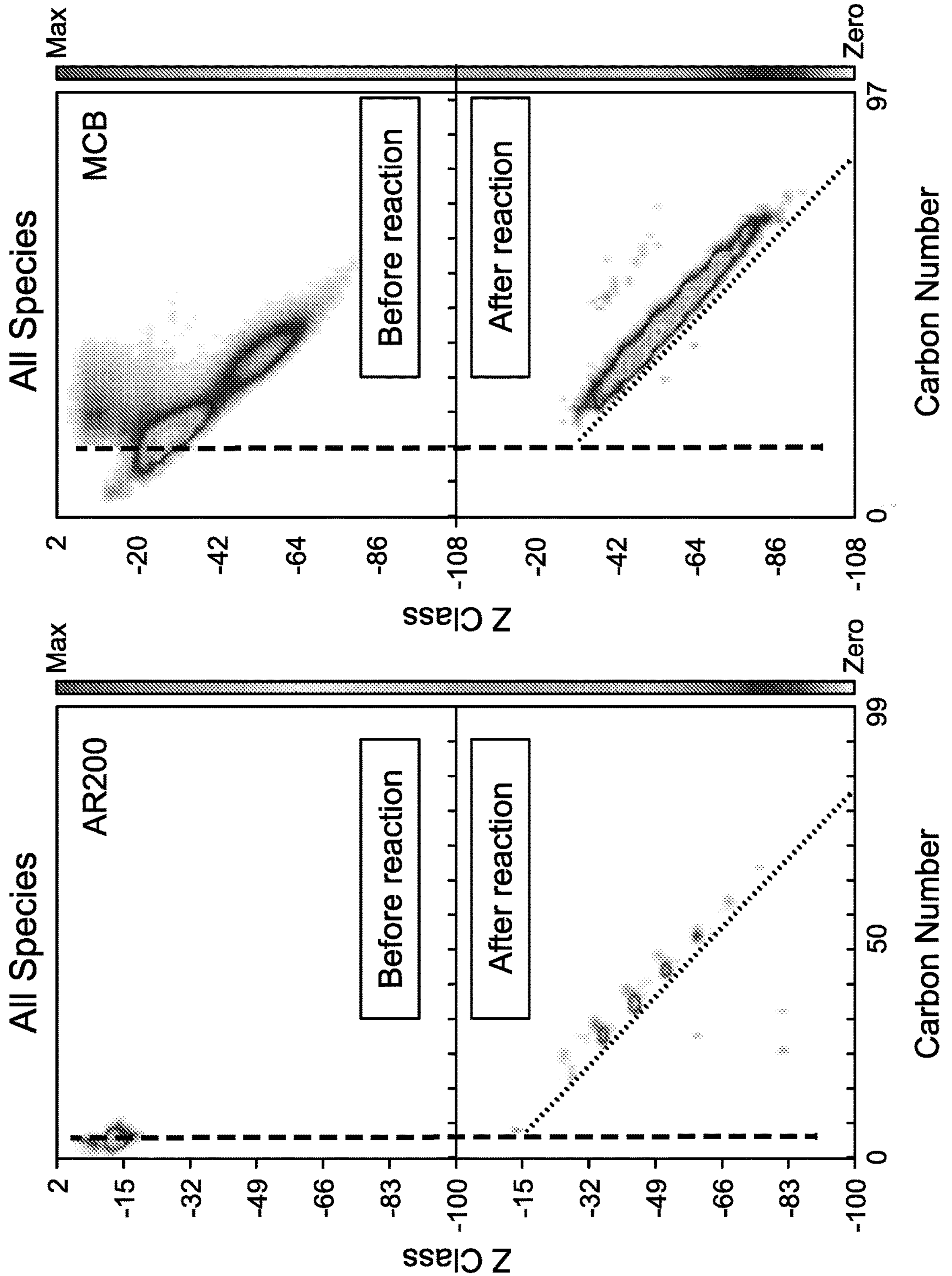
FIG. 6 illustrates FTICR-MS data before and after the reactions of AR200 and MCB with benzyl alcohol.

In a further example the reactions of AR200 and MCB with benzyl alcohol were studied by FTICR-MS. The results are shown in FIG. 6. An increase of molecular weight and decrease of Z number (hydrogen deficient number) clearly indicated the modification of the original mixed aromatic feedstock with benzylic functional groups. The FTICR-MS data also revealed little starting material remaining (as shown by dotted line on the left hand side of the charts), indicating high conversion under the reaction condition.

Example 7

Figure 7:
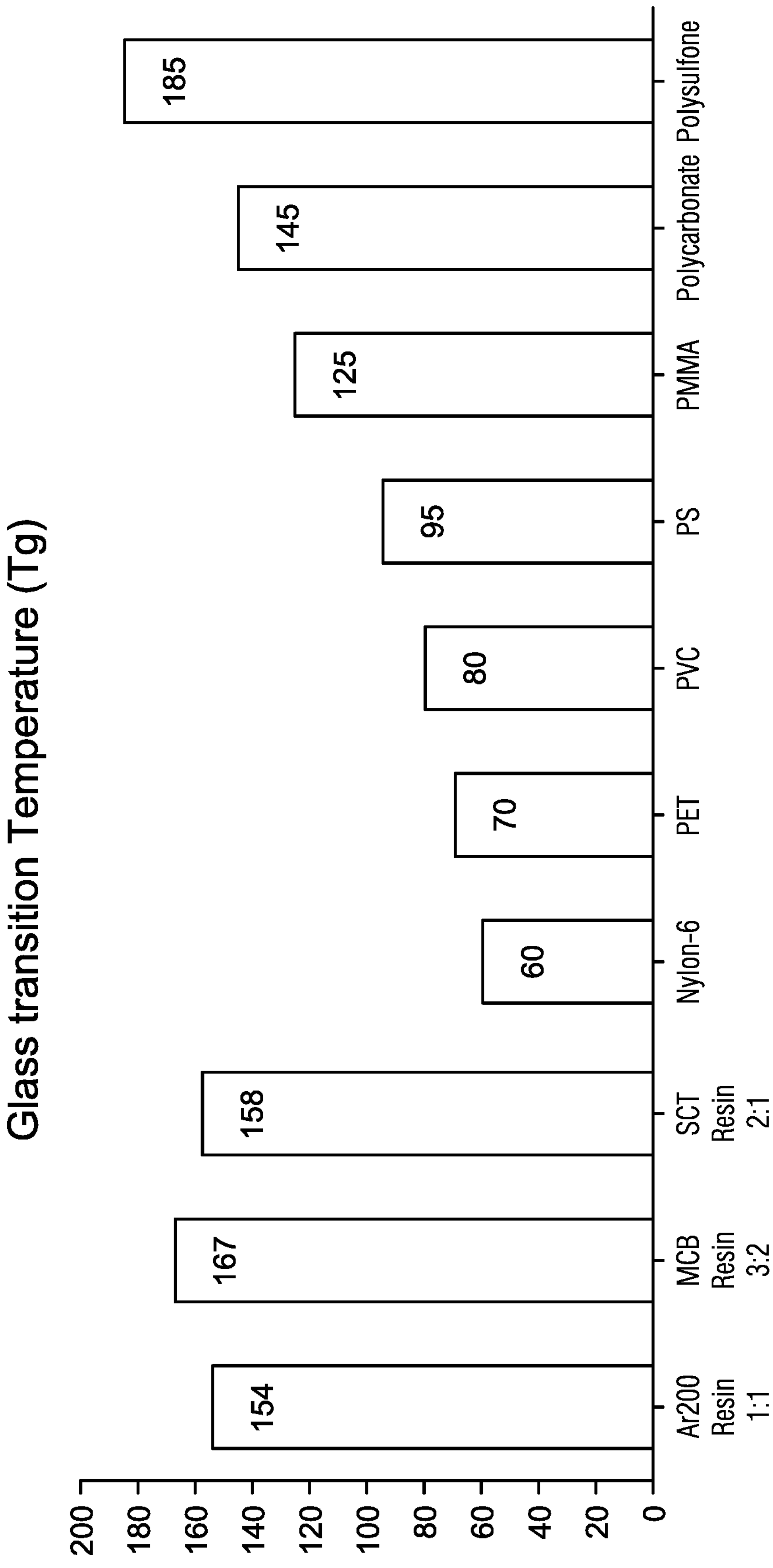
FIG. 7 is a bar chart of the glass transition temperatures of thermoset resins according to embodiments of the present disclosure and of comparative polymers.

Proppants were prepared by mechanical crushing and sieving the aromatic resins produced in Examples 3 to 5. In terms of thermal properties, the aromatic resin based proppants showed high glass transition temperature around 150° C. (see FIG. 7) and high thermal stability up to 460° C. A high glass transition temperature over 100° C. is required for proppants because the working temperature down hole can be as high as 100° C. Proppants also need to maintain high modulus at such temperature to prop open the cracks. The thermal stability of proppants needs to be high for prolonged effectiveness in shale gas/oil production. Therefore, high degradation temperature is required as illustrated in FIG. 5.

Several properties directly related to the performance of these materials as proppants were evaluated. The fracture conductivity of resins synthesized as described in Example 3 were evaluated using a modified API 19D protocol for measuring the long-term conductivity of proppants. A quantity of proppant was deposited between two sandstone cores and subjected to increasing confining stresses. After holding the system at a target stress for a period of time, the permeability of the proppant pack was measured by applying a pressure driven flow (82° C., 2% KCl solution) across the propped fracture. The fracture conductivity is the product of the measured permeability and the width of the proppant pack (that is, the distance between the fracture surfaces). The system was initially held at 1000 psi for 24 hours, before the initial conductivity was measured. Thereafter, the system was ramped to 2, 4, 6, 8, and 10 kpsi, and held for 2 hours prior to conductivity measurements at each applied stress.

Figure 8:
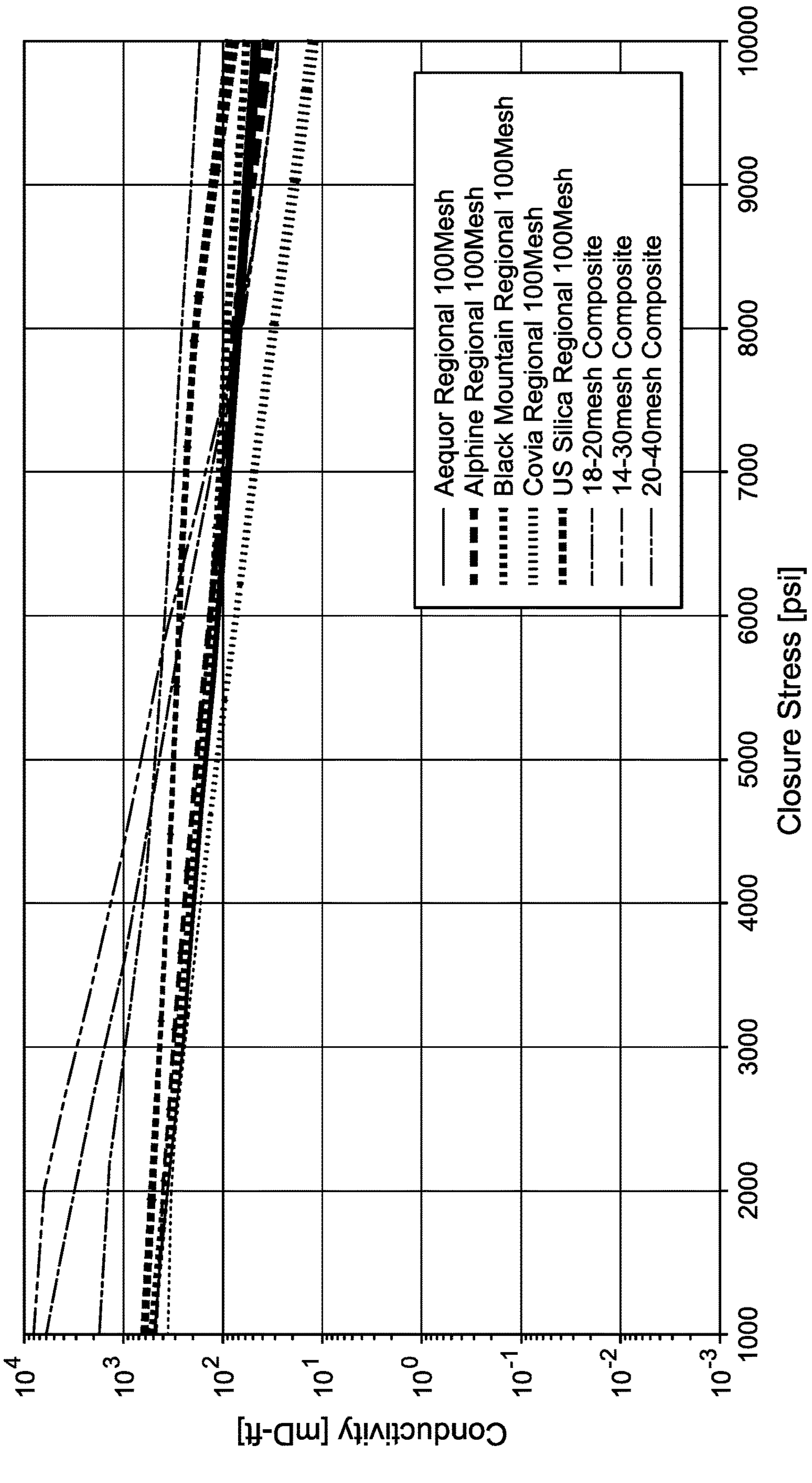
FIG. 8 is a plot of conductivity vs closure stress for various mesh ranges of thermoset resins according to embodiments of the present disclosure and of typically utilized regional sand packs.

The fracture conductivity of a monolayer of proppant is shown in FIG. 8 as dotted lines for three different mesh-ranges of resins synthesized by reacting AR200 with 1,4-dimethanol benzene in a 1:1 weight ratio. Of particular interest is the slope of the conductivity with increasing stress, which showed very comparable behavior to that of 100 mesh regional sand packs, which were measured under similar loading conditions, but at an overall proppant load of 0.4 $lb/ft^2$ of fracture area. The retention of significant fracture conductivity above 6000-8000 psi compared to typically utilized sands is a promising characteristic for use of the aromatic resins as proppants.

Figure 9:
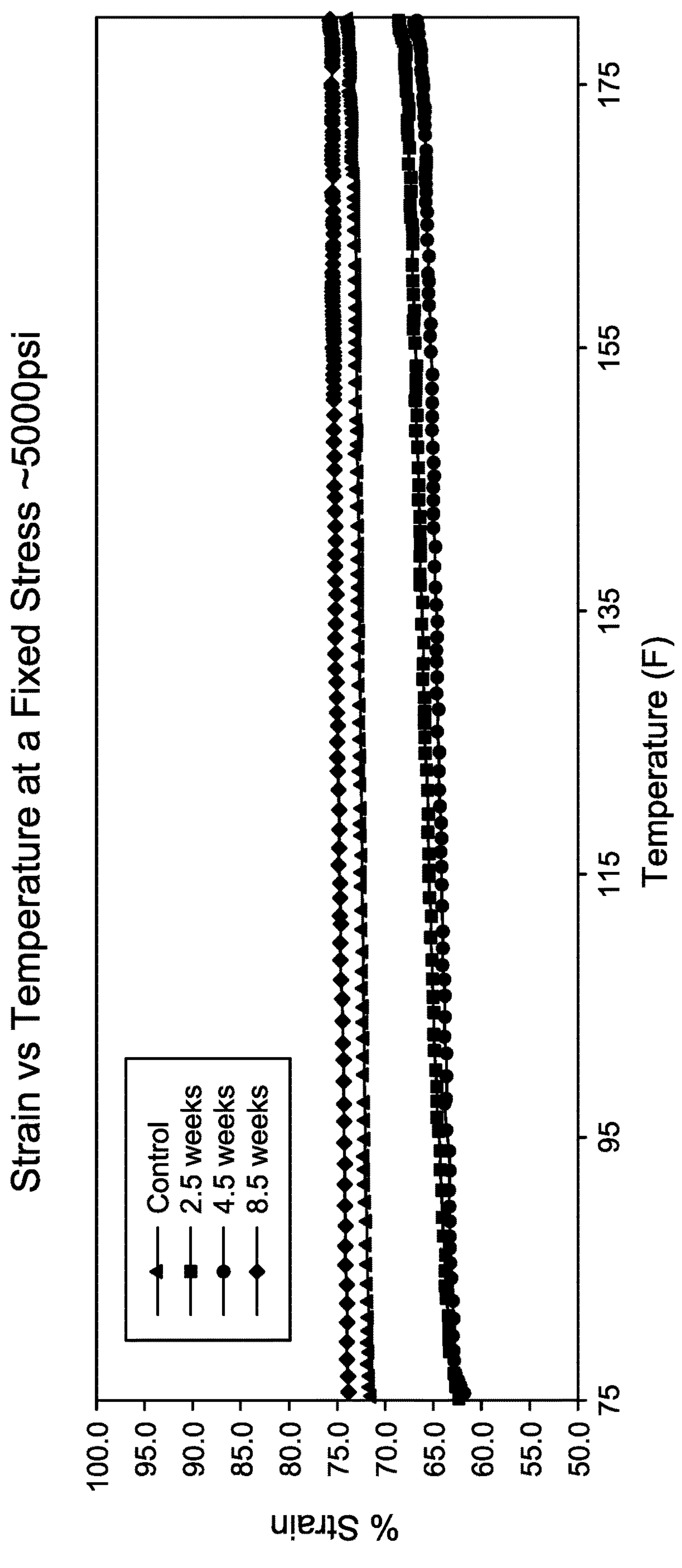
FIG. 9 is a plot of strain vs temperature at a fixed stress and at various times for thermoset resins according to embodiments of the present disclosure.

In addition, the resins were assessed for their long-term compatibility with reservoir fluids. It has been observed that a potential performance limiter for crosslinked hydrocarbon materials is their swelling behavior when exposed to oils for long periods of time, which would be typical of conditions for proppants in a producing reservoir. Small amounts of resins were stored in a light oil under typical reservoir conditions (6000 psi, 82° C.) for fixed periods of time (2.5, 4.5, and 8.5 weeks). Samples were tested in a uniaxial load frame by placing a small number of proppant particles between two billets. The samples were subjected to a fixed stress level and then heated to reservoir temperatures. The displacement and effective strain experienced by the proppant under the fixed load and temperature ramp were measured and is shown in FIG. 9. The control sample refers to the response of the imaged sample. It is worth noting that after an initial strain response induced by the application of the applied stress, the % strain remained nearly constant over the entire temperature ramp, suggesting little evidence of accelerated creep due to a poor crosslink network in the particle. Furthermore, the response of oils aged for increasing amount of time showed no obvious trend with duration of aging; the variation in strain response with age appeared more due to the variability in response of a small number of particles, rather than any systematic response due to oil exposure.

CERTAIN EMBODIMENTS

Certain embodiments of methods and materials according to the present disclosure are presented in the following paragraphs.

Embodiment 1 provides a method of making a thermoset material from a mixed aromatic feedstock comprising:

- contacting a linker agent and a catalyst with a mixed aromatic feedstock at a temperature effective to react the linker agent with molecules in the mixed aromatic feedstock, wherein the contacting is conducted at a first pressure for a first time; and
- curing reaction products formed during the first time at a second pressure for a second time, wherein the second pressure is higher than the first pressure;
- wherein the linker agent contains at least two functional groups that can react with the molecules in the mixed aromatic feedstock.

Embodiment 2 provides a method according to embodiment 1, wherein the mixed aromatic feedstock and linker agent are reacted at the first pressure until before gel point is reached, at which time the pressure is raised to the second pressure.

Embodiment 3 provides a method according to embodiment 1 or embodiment 2, wherein the first pressure is about 2.0 bar (200 kPa) or less, or about 1.5 bar (150 kPa) or less, or substantially atmospheric pressure.

Embodiment 4 provides a method according to any one of embodiments 1 to 3, wherein the second pressure is greater than about 2 bar (200 kPa), or greater than about 3 bar (300 kPa), or greater than about 4 bar (400 kPa), or greater than about 5 bar (500 kPa), or greater than about 10 bar (1 MPa).

Embodiment 5 provides a method according to any one of embodiments 1 to 4, wherein the first time is between about 1 hour and about 10 hours, or between 2 hours and about 8 hours, or between 3 hours and about 6 hours.

Embodiment 6 provides a method according to any one of embodiments 1 to 5, wherein the second time is between about 1 hour and about 48 hours, or between 2 hours and about 36 hours, or between about 3 hours and about 24 hours.

Embodiment 7 provides a method according to any one of embodiments 1 to 6, wherein the linker agent and molecules in the mixed aromatic feedstock are reacted for the first time at a temperature between about 20° C. and about 400° C., or between about 80° C. and about 200° C.

Embodiment 8 provides a method according to any one of embodiments 1 to 7, wherein the reaction products are cured for the second time at a temperature between about 100° C. and about 400° C. or between about 100° C. and about 200° C.

Embodiment 9 provides a method according to any one of embodiments 1 to 8, wherein the linker agent has the structure of Formula 1:

(Formula 1)

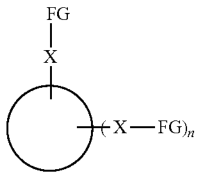

wherein the circle represent an aromatic hydrocarbon or aromatic heterocyclic moiety; FG (functional group) is, independently, aldehyde, vinyl, halogen, hydroxyl, acyl halide, tosylate, mesylate, carboxylic acid; each X, when present, is, independently, alkylene, cycloalkylene, or arylene bonded to a ring carbon atom of the aromatic hydrocarbon or aromatic heterocyclic moiety; n is an integer in the range of 1 to 5.

Embodiment 10 provides a method according to embodiment 9, wherein the —X-FG moieties are bonded to the same ring of the aromatic hydrocarbon or aromatic heterocyclic moiety.

Embodiment 11 provides a method according to embodiment 9, wherein the X-FG moieties are bonded to different rings of the aromatic hydrocarbon or aromatic heterocyclic moiety.

Embodiment 12 provides a method according to any one of embodiments 9 to 11, wherein FG is hydroxyl or halogen.

Embodiment 13 provides a method according to any one of embodiments 9 to 12, wherein X is methylene.

Embodiment 14 provides a method according to any one of embodiments 9 to 13, wherein n is 1.

Embodiment 15 provides a method according to any one of embodiments 1 to 11, wherein the linker agent has the structure of Formula 2:

(Formula 2)

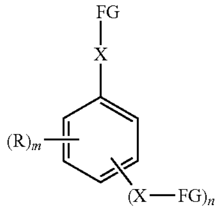

wherein FG (functional group) is, independently, aldehyde, vinyl, halogen, hydroxyl, acyl halide, tosylate, mesylate, carboxylic acid; each X, when present, is, independently, alkylene, cycloalkylene, or arylene; each R is, independently, H or alkyl, n is an integer in the range of 1 to 5 and m is 5−n.

Embodiment 16 provides a method according to embodiment 15, wherein FG is hydroxyl or halogen.

Embodiment 17 provides a method according to embodiment 15 or embodiment 16, wherein X is methylene.

Embodiment 18 provides a method according to any one of embodiments 15 to 17, wherein n is 1.

Embodiment 19 provides a method according to any one of embodiments 1 to 11, wherein the linker agent has the structure of Formula 3:

(Formula 3)

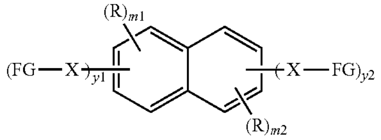

wherein FG (functional group) is, independently, aldehyde, vinyl, halogen, hydroxyl, acyl halide, tosylate, mesylate, carboxylic acid; each X, when present, is, independently, alkylene, cycloalkylene, or arylene; each R is, independently, H or alkyl; y1+y2 is an integer between 2 and 8; and m1+m2=8−(y1+y2).

Embodiment 20 provides a method according to embodiment 19, wherein FG is hydroxyl or halogen.

Embodiment 21 provides a method according to embodiment 19 or embodiment 20, wherein X is methylene.

Embodiment 22 provides a method according to any one of embodiments 19 to 21, wherein y1+y2 is 2.

Embodiment 23 provides a method according to any one of embodiments 19 to 22, wherein R is hydrogen.

Embodiment 24 provides a method according to any one of embodiments 19 to 23, wherein the —X-FG moieties are bonded to the same ring of the naphthalene moiety.

Embodiment 25 provides a method according to any one of embodiments 19 to 23, wherein the —X-FG moieties are bonded to different rings of the naphthalene moiety.

Embodiment 26 provides a method according to any one of embodiments 1 to 11, wherein the linker agent has the structure of Formula 4

(Formula 4)

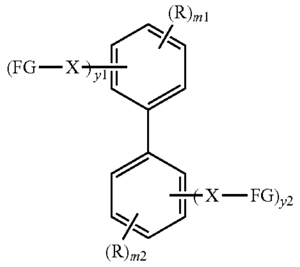

wherein FG (functional group) is, independently, aldehyde, vinyl, halogen, hydroxyl, acyl halide, tosylate, mesylate, carboxylic acid; each X, when present, is, independently, alkylene, cycloalkylene or arylene; each R is, independently, H or alkyl; y1+y2 is an integer between 2 and 10; and m1+m2=10−(y1+y2).

Embodiment 27 provides a method according to embodiment 26, wherein FG is hydroxyl or halogen.

Embodiment 28 provides a method according to embodiment 26 or embodiment 27, wherein X is methylene.

Embodiment 29 provides a method according to any one of embodiments 26 to 28, wherein y1+y2 is 2.

Embodiment 30 provides a method according to any one of embodiments 26 to 29, wherein R is hydrogen.

Embodiment 31 provides a method according to any one of embodiments 26 to 30, wherein the —X-FG moieties are bonded to the same ring of the biphenyl moiety.

Embodiment 32 provides a method according to any one of embodiments 26 to 30, wherein the —X-FG moieties are bonded to different rings of the biphenyl moiety.

Embodiment 33 provides a method according to any one of embodiments 1 to 32, wherein the catalyst is selected from a group consisting of inorganic acids, organic acids, and Lewis acids.

Embodiment 34 provides a method according to any one of embodiments 1 to 33, wherein the catalyst is selected from a group consisting of aluminum chloride, trifluoromethanesulfonic acid, p-toluenesulfonic acid, sulfuric acid, phosphoric acid, polyphosphoric acid, solid acids such as tungstic acid, and polyoxometalate.

Embodiment 35 provides a method according to any one of embodiments 1 to 34, wherein the linker agent is present in the amount of 1% to 200% by weight, based on the weight of the mixed aromatic feedstock.

Embodiment 36 provides a method according to any one of embodiments 1 to 35, wherein the linker agent is present in the amount of 50% to 200% by weight, based on the weight of the mixed aromatic feedstock.

Embodiment 37 provides a method according to any one of embodiments 1 to 36, wherein the catalyst is in the amount of 0.1% to 10% by weight, based on the total weight of the mixed aromatic feedstock and linker agent.

Embodiment 38 provides a method according to any one of embodiments 1 to 37, wherein the method is performed in the absence of additional solvent.

Embodiment 39 provides a method according to any one of embodiments 1 to 38, wherein the mixed aromatic feedstock comprises a light aromatic stream including aromatics from steam cracking (e.g., BT(E)X and pyrolysis gasoline), reformate from catalytic reformers, and mixed alkylated naphthalenes.

Embodiment 40 provides a method according to any one of embodiments 1 to 38, wherein the mixed aromatic feedstock comprises one or more of residues of petrochemical refining or extraction, including vacuum residue, fluidic catalytic cracking (FCC') bottoms (slurry oil, main column bottoms (MCB)), steam cracker tar, asphaltenes, C3-C7 rock, bitumen, K-pot bottoms, lube extracts, various streams from refinery processes and other synthetic aromatic hydrocarbons.

Embodiment 41 provides a method according to any one of embodiments 1 to 40, wherein the mixed aromatic feedstock has a H/C ratio less than 1.2.

Embodiment 42 provides a method according to any one of embodiments 1 to 41, wherein the mixed aromatic feedstock has an aromatic content of greater than 50% by weight, or greater than 60% by weight, or greater than 70% by weight, or greater than 80% by weight.

Embodiment 43 provides a method according to any one of embodiments 1 to 42, wherein the average molecular weight of molecules in the mixed aromatic feedstock is between about 50 and about 1200 Daltons, or between about 150 and about 1200 Daltons, or between about 300 and about 1200 Daltons, or between about 400 and about 1200 Daltons, or between about 600 and about 900 Daltons, or between about 650 and about 850 Daltons.

Embodiment 44 provides a method according to any one of embodiments 1 to 43, wherein the mixed aromatic feedstock comprises one or more transition metals.

Embodiment 45 provides a method according to any one of embodiments 1 to 44, wherein at least some of the molecules in the mixed aromatic feedstock comprise one or more atoms selected from the group consisting of nitrogen, sulfur and oxygen.

Embodiment 46 provides a method according to any one of embodiments 1 to 45, wherein at least some of the molecules in the mixed aromatic feedstock further comprise one or more functional groups comprising one or more of oxygen, nitrogen or sulfur atoms, wherein said functional groups are present as a substituent or within a substituent on an aromatic or aliphatic carbon atom.

Embodiment 47 provides a thermoset material obtained by the method according to any one of embodiments 1 to 46.

Embodiment 48 provides a thermoset material according to embodiment 47, wherein the thermoset material has a compressive strength greater than 100 MPa, when measured according to ASTM D695.

Embodiment 49 provides a thermoset material comprising a plurality of aromatic hydrocarbon moieties and/or aromatic heterocyclic moieties linked by linking groups, wherein the thermoset material has a compressive strength greater than 100 MPa, when measured according to ASTM D695.

Embodiment 50 provides a thermoset material according to embodiment 48 or embodiment 49, wherein the weight average molecular weight of the thermoset material is greater than about 100,000 Daltons, or greater than about 200,000 Daltons, or greater than about 300,000 Daltons, or greater than about 500,000 Daltons, or greater than about 700,000 Daltons, or greater than about 1,000,000 Daltons.

Embodiment 51 provides an article of manufacture comprising one or more thermoset materials according to any one of embodiments 47 to 50.

Embodiment 52 provides proppant particulates comprising one or more thermoset materials according to any one of embodiments 47 to 50.

Embodiment 53 provides proppant particulates according to embodiment 52, wherein the proppant particulates have a fracture conductivity of at least 100 mD·ft (30 mD·m) at a pressure of 6000 psi (41.4 MPa) or greater.

Embodiment 54 provides a composite comprising one or more thermoset materials according to any one of embodiments 47 to 50 and at least one other material, for example, a filler and/or another polymer.

Embodiment 55 provides a method, said method comprising:

providing a plurality of proppant particulates according to embodiment 52;

introducing a fracturing fluid comprising the plurality of proppant particulates into a subterranean formation; and depositing at least a portion of the plurality of proppant particulates within one or more fractures in the subterranean formation.

All patents, patent applications and other documents cited herein are fully incorporated by reference to the extent such disclosure is not inconsistent with this disclosure and for all jurisdictions in which such incorporation is permitted.

Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A method of making a thermoset material from a mixed aromatic feedstock comprising:

contacting a linker agent and a catalyst with a mixed aromatic feedstock at a temperature effective to react the linker agent with molecules in the mixed aromatic feedstock, wherein the contacting is conducted at a first pressure for a first time; and curing reaction products formed during the first time at a second pressure for a second time, wherein the second pressure is higher than the first pressure;

wherein the linker agent contains at least two different functional groups that can react with the molecules in the mixed aromatic feedstock; and wherein the thermoset material has a compressive strength greater than about 100 MPa, when measured according to ASTM D695.

2. A method according to claim 1, wherein the mixed aromatic feedstock and linker agent are reacted at the first pressure until before gel point is reached, at which time the pressure is raised to the second pressure.

3. A method according to claim 1, wherein the first pressure is about 2.0 bar (200 kPa) or less.

4. A method according to claim 1, wherein the linker agent and molecules in the mixed aromatic feedstock are reacted for the first time at a temperature between about 20° C. and about 400° C.

5. A method according to claim 1, wherein the reaction products are cured for the second time at a temperature between about 100° C. and about 400° C.

6. A method according to claim 1, wherein the linker agent has the structure of Formula 1:

(Formula 1)

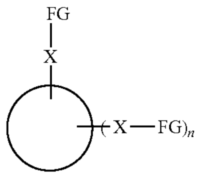

wherein the circle represent an aromatic hydrocarbon or aromatic heterocyclic moiety; FG (functional group) is, independently, aldehyde, vinyl, halogen, hydroxyl, acyl halide, tosylate, mesylate, carboxylic acid; each X, when present, is, independently, alkylene, cycloalkylene, or arylene bonded to a ring carbon atom of the aromatic hydrocarbon or aromatic heterocyclic moiety; n is an integer in the range of 1 to 5.

7. A method according to claim 1, wherein the linker agent has the structure of Formula 2:

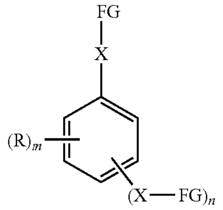

(Formula) wherein FG (functional group) is, independently, aldehyde, vinyl, halogen, hydroxyl, acyl halide, tosylate, mesylate, carboxylic acid; each X, when present, is, independently, alkylene, cycloalkylene, or arylene; each R is, independently, H or alkyl, n is an integer in the range of 1 to 5 and m is 5-n.

8. A method according to claim 1, wherein the linker agent has the structure of Formula 3:

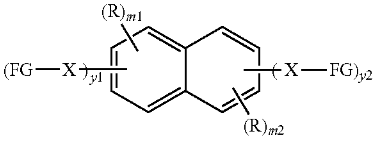

(Formula 3) wherein FG (functional group) is, independently, aldehyde, vinyl, halogen, hydroxyl, acyl halide, tosylate, mesylate, carboxylic acid; each X, when present, is, independently, alkylene, cycloalkylene, or arylene; each R is, independently, H or alkyl; y1+y2 is an integer between 2 and 8; and m1+m2=8−(y1+y2).

9. A method according to claim 1, wherein the linker agent has the structure of Formula 4:

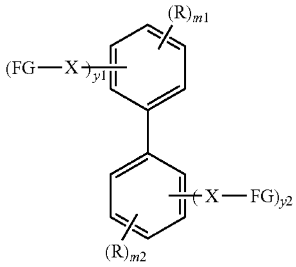

(Formula 4) wherein FG (functional group) is, independently, aldehyde, vinyl, halogen, hydroxyl, acyl halide, tosylate, mesylate, carboxylic acid; each X, when present, is, independently, alkylene, cycloalkylene or arylene; each R is, independently, H or alkyl; y1+y2 is an integer between 2 and 10; and m1+m2=10−(y1+y2).

10. A method according to claim 1, wherein the linker agent is present in the amount of 1% to 200% by weight, based on the weight of the mixed aromatic feedstock.

11. A method according to claim 1, wherein the method is performed without any solvent.

12. A method according to claim 1, wherein the mixed aromatic feedstock has a hydrogen to carbon (H/C) ratio less than 1.2.

13. A method according to claim 1, wherein the mixed aromatic feedstock has an aromatic content of greater than 50% by weight.

* * * * *